Jan. 30, 1951 J. P. BARNES 2,539,654
CHANGING SIGN INDICATOR
Filed March 1, 1949
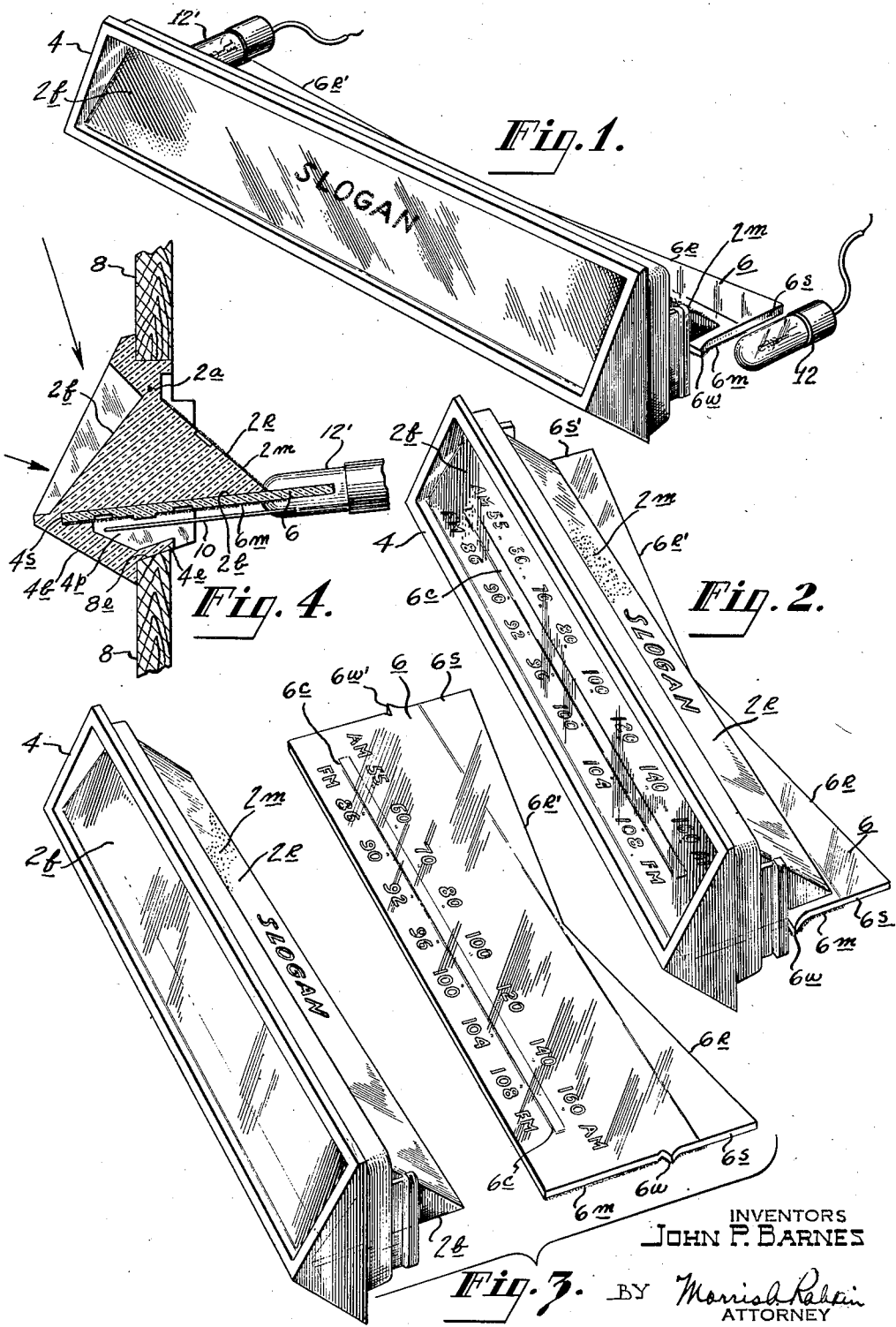
INVENTORS
JOHN P. BARNES
BY Morrish Rabin
ATTORNEY Patented Jan. 30, 1951

2,539,654

UNITED STATES PATENT OFFICE 2,539,654

CHANGING-SIGN INDICATOR

John P. Barnes, Springfield, Pa., assignor to Radio Corporation of America, a corporation of Delaware Application March 1, 1949, Serial No. 79,056

1 Claim. (Cl. 40—137)

This invention relates to indicators, particularly to improvements in so-called "phantom" or "changing-sign" indicators, and will be described as embodied in a radio dial wherein the "signs" which are separately presented to view comprise (1) a slogan or trademark and (2) one or more dial scales.

Specifically, it is an object of the invention to provide a radio dial, or analogous indicator which, when viewed from a point adjacent to the eye level of a seated observer, shall present to view the trade-mark or advertising slogan of the manufacturer of the instrument and, upon the observer arising and approaching the instrument, for the purpose of tuning it, the said mark or slogan shall suddenly disappear and its tuning scale or scales appear.

Another and important object of the present invention is to provide a changing-sign indicator wherein the separately viewable signs shall be of substantially equal and excellent clarity.

Another object of the invention is to provide an illuminable indicator wherein the illumination shall be spread substantially uniformly throughout, and this, too, without the use of auxiliary reflectors or mirrors.

Still another object of the invention is to provide a combined changing-sign indicator and mounting escutcheon within which the signs shall be framed when they are separately presented to the eyes of an observer.

Yet another object of the invention is to provide a simple, inexpensive and trouble-free, changing-sign indicator which, by reason of the simplicity and economy of its parts, shall lend itself readily to mass production and assembly methods.

All of the foregoing objects are achieved in a preferred embodiment of the invention, (a) by providing a transparent, right-angle triangular prism constituted of "Lucite" or other suitable moldable material, (b) mounting the prism with the apex of its right-angle pointed substantially in the vertical direction, (c) marking one of the signs of the changing sign indicator upon the rear surface of the prism, (d) presenting the other sign to the bottom surface of the prism, as on a discrete transparent, plate-like member which protrudes beyond the rear edge of the prism and is provided with a rear edge which slants inwardly from each of its protruding side edges and (e) edge-lighting the protruding side edges of the plate-like member whereby the light is applied uniformly to said member and hence to its "sign" by reason of the unique shape of said plate-like member. Such a preferred embodiment of the invention is shown in the accompanying drawing, wherein:

Fig. 1 is a view in perspective of an illuminable changing-sign indicator, constructed and arranged in accordance with the principle of the invention, and showing one of its signs or slogans as it appears to an observer looking into the escutcheon of the device from a point beneath a line drawn perpendicular to the inclined front surface of the indicator.

Fig. 2 is a view in perspective of the changing-sign indicator of Fig. 1, but with its lamps removed, and showing the other one of the changing signs as it appears to the eyes of an observer looking into the escutcheon from a somewhat higher level.

Fig. 3 is an exploded view of the changing-sign indicator of Figs. 1 and 2, showing the separate origins of its signs, and Fig. 4 is a cross-sectional view of the changing-sign indicator mounted in the instrument panel of a radio receiver and provided with a pointer for the tuning scales which, as shown in Figs. 2 and 3, comprise one of the "signs" of the indicator.

In the drawing, wherein the same reference characters are applied to all figures, 2 designates generally, a substantially right-angled isosceles triangular, transparent prism and 4 designates, generally, an escutcheon within which one face of the prism is framed and which serves to support both the prism and a discrete dial plate 6 for the prism, in an aperture in the front panel 8 (Fig. 4) of a radio receiver or the like. As shown more clearly in Fig. 4, the apex, or virtual apex, 2a of the right angle of the prism is pointed upwardly, substantially vertically, hence one of the two substantially equal faces, forming the right angle, comprises the "front" surface 2f, the other right-angle face the "rear" surface 2r and the third face the "bottom" surface 2b, of the prism.

It is upon the rear surface 2r of the prism that one (of the two) signs of the indicator is printed, engraved, embossed or otherwise marked. In the instant case said first sign comprises the trade-mark or slogan of the manufacturer of the radio set or other instrument to which the indicator is affixed. As shown in Fig. 1, this slogan, as reflected from the bottom surface 2b of the prism, appears right-side-up to an observer looking through the opening in the escutcheon 4 along a line (indicated by the lower arrow, Fig. 4) which intersects the front surface 2f of the prism at an angle less than a right angle.

The clarity with which, and the exact range of angles through which the slogan may be viewed depends, to some extent, upon the index of refraction of the prism material and, to a lesser degree, upon the manner in which the slogan has been marked upon the rear surface of the prism. Methyl-methacrylate resin ("Lucite"), because of (a) its high index of refraction, (b) its light-conducting properties (which are similar to those of natural quartz), and (c) its excellent molding properties, recommends itself as the material from which the prism 2 and its escutcheon 4 should be made. If made of this material, the prism and its escutcheon may be formed in a single piece, as in an injection-type mold, not shown.

The other one of the signs of the changing-sign indicator comprises a dial which, in the instant case, takes the form of two separate linear scales (FM and AM) marked preferably on the underside of the discrete transparent member 6. This plate-like element 6 is mounted in accordance with the present invention, in proximity to (but not necessarily "touching") the bottom surface 2b of the prism 2. As shown in Fig. 4, the front end of this plate 6 is received (from the rear of the panel 8) in a slot 4s which extends along the side edges of the escutcheon and terminates beneath the lower front edge of the prism. A clearance space 4p, in which a pointer 10 for the FM and AM dial scales is adapted to travel, is provided beneath the plate 6 by making the base of the escutcheon 4 in the form of a bracket or arm 4b which slants downwardly from the inner end of the slot 4s and terminates in an edge portion 4e which rests upon the lower transverse surface 8e of the panel aperture.

It will be observed that the dial plate 6 protrudes beyond the rear edge of the bottom surface of the prism and there is a small protuberance 6w (6w'), on each side edge of the plate. These protuberances are positioned to determine the orientation of the plate 6 with respect to the bottom surface 2b of the prism when the front edge of the plate is entered into the slot 4s in the escutcheon. As previously mentioned, the plate 6, the escutcheon 4 and the prism 2 are all preferably constituted of a thermoplastic material, hence when the plate 6 has been entered into the slot 4s, the protuberances 6w (6w') may be welded or fused to the rear surface of the escutcheon 4. The portions 6s (6s') of the side edges of the plate 6 which extend rearwardly of the prism beyond the protuberances 6w and 6w' serve to receive light from a pair of electric bulbs 12 and 12' disposed adjacent to the said edges. In order to distribute the light evenly across the scales of the indicator, the rear edge of the plate is shaped to slant inwardly, toward the prism, from each of its protruding side edges, as indicated at 6r, 6r'.

It will be observed upon close inspection of Fig. 2 that the rear surface 2r of the prism is provided with an opaque coating or mask 2m. This coating 2m preferably extends over the back of the colored letters of the slogan and, in any event, serves to conceal the interior of the cabinet from the observer. A similar coating or mask 6m on the bottom of the plate-like member 6 covers all but (a) the clear space 6c through which the pointer 10 is viewed and, (b) the protruding, illuminated edge portions 6s, 6s', and (c) the inwardly inclined rear portion, of the said scale-bearing plate. The front and rear ends of the escutcheon 4 and prism 2 may also be masked if necessary to prevent glare and excessive illumination of the slogan.

Although the invention has been described as applied to changing-sign indicators wherein the signs are presented to view upon the movement of the observer with respect to the indicator, it is apparent that the indicator may take the form of an advertising display capable of presenting its signs separately to a stationary observer simply by mounting the device, as upon pivots (not shown) on its opposite ends, for repeated tiltable movement.

It will now be apparent that the present invention provides an improved, easily readable changing-sign indicator and one characterized by the simplicity and economy of its parts and by its trouble-free performance.

What is claimed is:

An indicator comprising a substantially right-angled, triangular, transparent prism, means including an escutcheon for supporting said prism with the apex of its right angle pointed substantially in a vertical direction whereby one of the right-angle faces of said prism comprises its front surface, the other right-angle face its rear surface, and the third face its bottom surface; indicia on said rear surface of said prism and a discrete indicia-bearing member mounted in proximity to said bottom surface of said prism; said prism, said escutcheon and said discrete indicia-bearing member being constituted of a synthetic thermoplastic resin; said prism and said escutcheon comprising a unitary molded assembly containing a slot in which an edge of said discrete member is received; said member being provided on each of its side edges with a protuberance for orienting said member in said slot and positioned to be thermoplastically welded to said escutcheon.

JOHN P. BARNES.

REFERENCES CITED

The following references are of record in the file of this patent:

UNITED STATES PATENTS

| Number | Name | Date |
| --- | --- | --- |
| 540,768 | Western | June 11, 1895 |
| 1,770,568 | Bower | July 15, 1930 |
| 2,367,577 | Hayward | Jan. 16, 1945 |